UNITED STATES PATENT OFFICE.

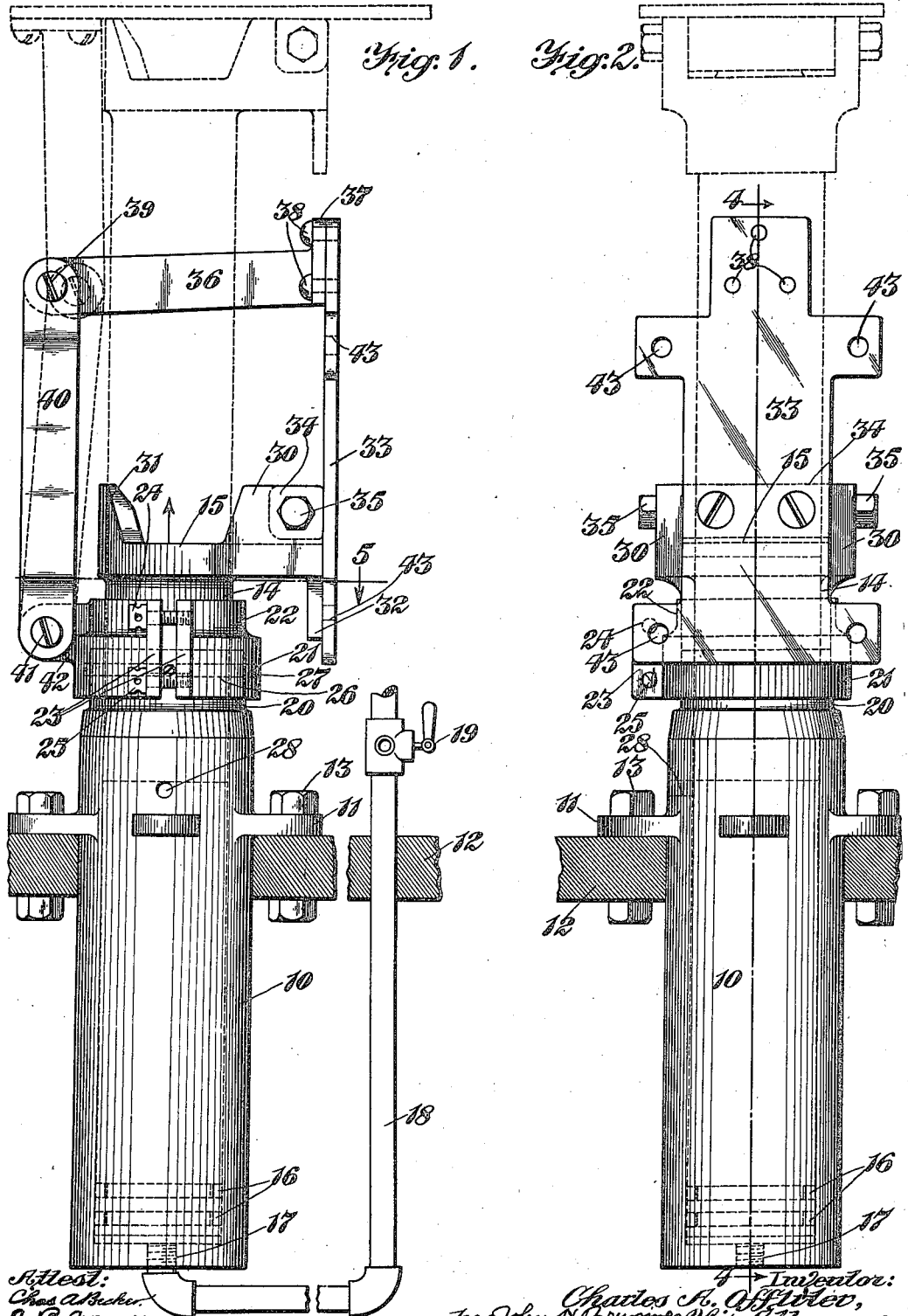

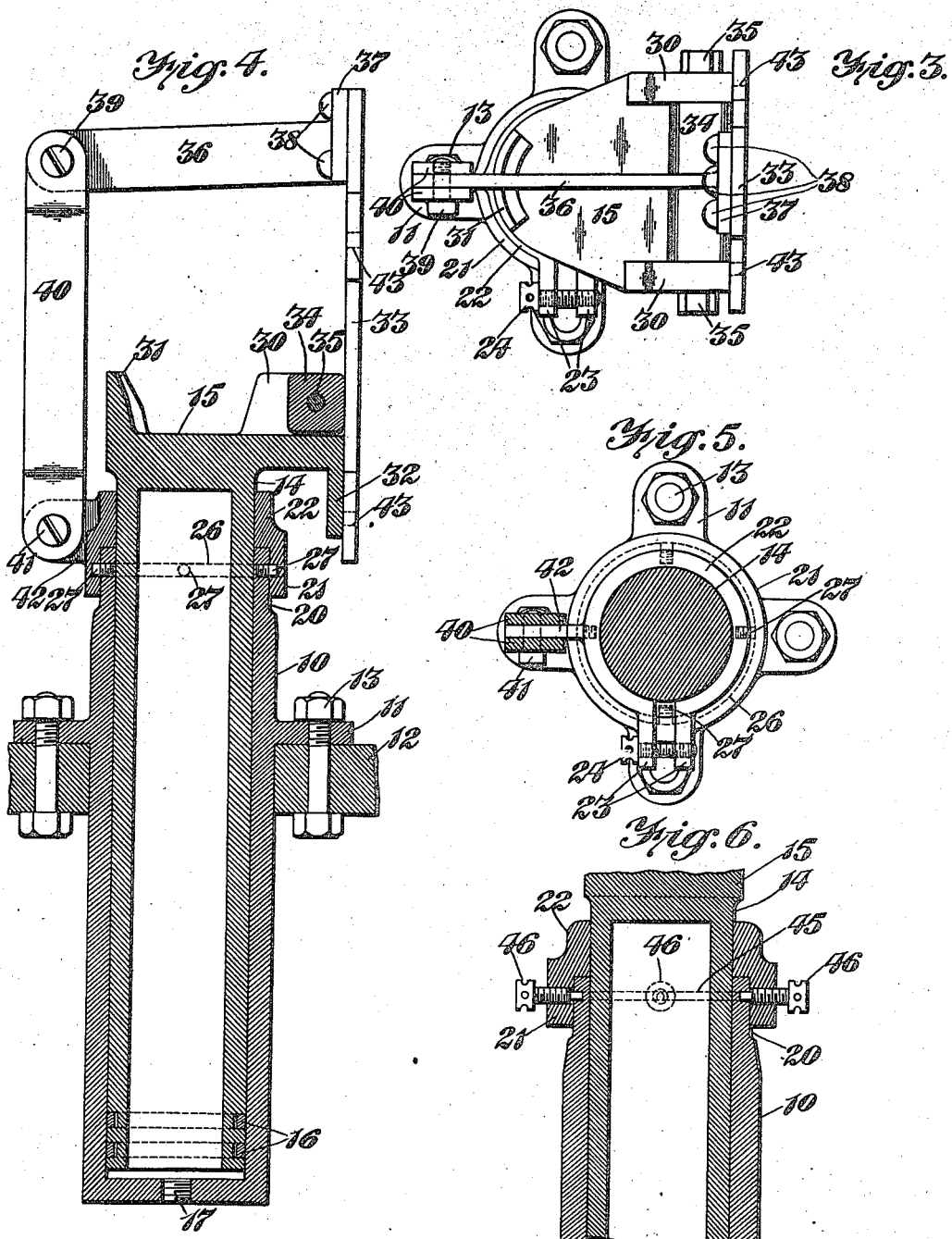

CHARLES A. OFFLITER, OF ST. LOUIS, MISSOURI.

MACHINE-SHOP WORK-SUPPORT.

1,154,333. Specification of Letters Patent. Patented Sept. 21, 1915.

Application filed April 1, 1914. Serial No. 828,825.

*To all whom it may concern:*

Be it known that I, CHARLES A. OFFLITER, a citizen of the United States, and residing at St. Louis, in the State of Missouri, have invented certain new and useful Improvements in Machine-Shop Work-Supports, of which the following is a specification.

This invention relates to work supports, and more particularly, to work supports for use in machine shops for repair work.

In the repair of heavy machinery, such as air pumps used on locomotives, etc., the work to be repaired is heavy and inconvenient to handle, and requires for its manipulation the use of cranes. Such work must, moreover, be shifted around on the bench while being repaired, and this requires considerable time where the work must be handled with a crane.

Some of the objects of this invention, therefore, are to provide a work support which will raise the work to a height suitable for the workman to operate on the same, which will position the work properly, which will permit the work to be shifted to different positions when raised, and in which the work can be placed in position thereon without requiring the use of a crane.

Further objects are to provide a work support in which the work is raised from the floor to operative position by power, and locked in any of its adjusted positions.

Further objects will appear from the detail description taken in connection with the accompanying drawings, in which:

Figure 1 is a side elevation of a work support embodying this invention, Fig. 2 is a front elevation, Fig. 3 is a plan, Fig. 4 is a section on the line 4, Fig. 2, Fig. 5 is a section on the line 5, Fig. 1, and, Fig. 6 is a detail section showing another embodiment of this invention.

Referring to the accompanying drawings, 10 designates a cylinder forming the base of the work support and having lugs 11 whereby it may be supported in a floor 12, and bolted in position by means of bolts 13. A hollow piston or carrier 14 is mounted to slide vertically and rotate in the cylinder, and the upper end of the piston has a head or bracket 15, while the lower end is provided with piston rings 16. The lower end of the cylinder has an air inlet 17 connected with an air pipe 18 controlled by a two-way valve 19.

The upper end 20 of the cylinder is reduced in diameter and machined to receive a split clamping ring 21. This clamping ring has a reduced part 22 adapted to engage the machined piston 14, and form a shoulder resting on the upper end of the cylinder. The clamping ring is provided with flanges 23, and these flanges are connected at their upper ends, opposite the reduced part 22, with a clamping bolt 24, and at their lower ends, opposite the cylinder part 20, by clamping bolt 25, the bolts passing loosely through one flange and threaded into the other. The clamping ring is provided with a circumferential groove 26, and the cylinder part 20 has screwed therein pins 27 entering the groove 26, so as to hold the ring against endwise movement with respect to the cylinder, and permit rotary movement thereon. The cylinder is provided with a vent hole 28 for a purpose hereinafter to be described.

The head or bracket 15 has formed thereon spaced bearing lugs 30 and stop lugs 31 and 32. A work holder or table comprising a plate 33, has a bearing block 34 positioned between the bearing lugs 30, and pivoted thereto by screws 35. An arm 36 is provided with a flange 37 attached to the work holder 33 by screws 38, and this arm is pivotally connected by a screw 39 to a link 40, pivotally connected by a screw 41 with a lug 42 projecting from the clamping ring 21. The work holder 33 is provided with a series of apertures 43 permitting the work to be bolted thereto.

In the construction shown in Fig. 6, the reduced part 20 of the cylinder has formed therein a circumferential groove 45 engaged by a series of screws 46 in the ring.

Assuming the parts to be in the position shown in full lines in Figs. 1, 2 and 3, with the piston or carrier in lowered position and with the valve 19 closed, it will be seen that the work holder or table 33 will be in a vertical position in engagement with the stop 32, which stop limits the downward movement of the piston or carrier 14. This carrier and the work holder thereon will now be close to the floor line. The work or piece of machinery to be repaired, placed on a truck or on the floor against the work holder, can now be bolted to the work holder by bolts engaging the work and passing through the holes 43. After the work is bolted to the work holder, the valve 19 is opened, permitting the compressed air to enter the cylinder and raise the piston or carrier 14 to dotted position, Figs. 1 and 2. As the piston is raised, the linkage connection 36—40 between the work holder and the clamping ring will cause this work holder, with the work thereon, to move from a vertical to a horizontal position. The movement of the piston is arrested by the engagement of the work holder with the stop 31 on the carrier, and as the piston or carrier reaches this position, it will uncover the vent 28 and prevent damage to the parts, as well as give a signal to the workman. The workman will now tighten the screw 24 so as to cause the clamping ring to clamp the piston, and he will then close the valve 19. The work holder and carrier will thus be locked in raised position. The parts are, however, so constructed that tightening of the screw 24 will only clamp the upper part 22 of the clamping ring sufficiently to clamp the piston or carrier, but not clamp the machined part 20 of the cylinder. The carrier and the work holder thereon will thus be supported by the ring 21, so as to be free for rotary movement with the ring on the cylinder. The work may thus be rotated to any suitable position to suit the convenience of the workman. If the workman now desires to clamp the work carrier against rotation, he will tighten the clamping screw 25, which will cause the clamping ring to clamp the cylinder and lock the carrier against rotation. If the workman has completed the work, he will first operate valve 19 to turn on the air, then loosen the clamping screws 25 and 24, and by then turning the valve 19 so as to first shut off the air and then connect the pipe 18 gradually with the outside air, the work carrier can be gradually lowered to the position shown in full lines in Figs. 1, 2 and 3. During this movement, the work holder will swing from a horizontal to a vertical position, when the work can be removed.

It will thus be seen that the invention accomplishes its objects. A work holder is provided which will raise the work from the floor and position it at such a height as to permit the operator to conveniently work thereon. The work can be moved around to any suitable position, so as to permit the operator to inspect and work on the same very conveniently. The work holder can be locked against rotation or against movement either in raised or lowered position. The work can also be raised without turning it over, by disconnecting the arm 36 from the link 40 through the removal of the screw 39. This permits the work to be held at a suitable height in such a position that the work table is vertical, which is often desired in certain classes of work.

It is obvious that various changes may be made in details of construction, within the scope of the claims without departing from the spirit of this invention, and it is to be understood, therefore, that this invention is not to be limited to the specific construction shown and described.

Having thus described the invention, what is claimed is:

1. A machine shop work support comprising a base, a work holder, means for mounting said work holder on said base constructed and arranged to permit said work holder to move vertically, swing angularly, and rotate on said base, and means for concurrently moving said work holder vertically and angularly.

2. A machine shop work support comprising a base, a work holder, means for mounting said work holder on said base constructed and arranged to permit said work holder to move vertically, swing angularly, and rotate on said base, means for raising said work holder, means operated during the raising of said work holder constructed and arranged to swing it from a vertical to a horizontal position, and means for locking said work holder in raised position.

3. A machine shop work support comprising a base, a work holder, means for mounting said work holder on said base constructed and arranged to permit said work holder to move vertically, swing angularly, and rotate on said base, means for moving said work holder vertically, means operated during vertical movement of said work holder constructed and arranged to swing it angularly, and means for locking said work holder against rotation.

4. A machine shop work support comprising a base, a work holder, means for mounting said work holder on said base constructed and arranged to permit said work holder to move vertically, swing angularly, and rotate on said base, means for raising said work holder, means operated during the raising of said work holder constructed and arranged to swing it from a vertical to a horizontal position, and means for locking said work holder against movement in either of its positions.

5. A machine shop work support comprising a base, a work holder, means for mounting said work holder on said base constructed and arranged to permit said work holder to move vertically and swing on said base, means operating during vertical movement of said work holder constructed to swing said work holder, and means for locking said work holder in raised position.

6. A machine shop work support comprising a base, a work holder, means for mounting said work holder on said base constructed and arranged to permit said work holder to move vertically, rotate, and swing on said base, means operating during vertical movement of said work holder constructed to swing said work holder, and means for locking said work holder against rotation.

7. A machine shop work support comprising a base, a work holder, means for mounting said work holder on said base constructed and arranged to permit said work holder to move vertically, rotate, and swing on said base, means operating during vertical movement of said work holder constructed to swing said work holder, and means for locking said work holder against rotation and against vertical movement.

8. A machine shop work support comprising a base, a carrier mounted for vertical and rotary movements on said base, a work holder mounted to swing on said carrier, and means operating during vertical movement of said carrier for swinging said work holder on said carrier.

9. A machine shop work support comprising a cylinder, a piston mounted for vertical movement therein, a work holder mounted to swing on said piston, and means operating during vertical movement of said piston for swinging said work holder on said piston.

10. A machine shop work support comprising a cylinder, a piston mounted for vertical and rotary movements therein, a work holder mounted to swing on said piston, and means operating during vertical movement of said piston for swinging said work holder on said piston.

11. A machine shop work support comprising a cylinder, a piston mounted for vertical movement therein, a work holder mounted to swing on said piston, means operating during vertical movement of said piston for swinging said work holder on said piston; and means for locking said piston against vertical movement.

12. A machine shop work support comprising a cylinder, a piston mounted for vertical and rotary movements therein, a work holder mounted to swing on said piston, means operating during vertical movement of said piston for swinging said work holder on said piston, and means for locking said piston against vertical and rotary movements.

13. A machine shop work support comprising a cylinder, a piston mounted for vertical and rotary movements therein, a clamping ring rotatively mounted on said cylinder, a work holder mounted to swing on said piston, and means connecting said work holder to said clamping ring and operating during vertical movement of said piston for swinging said work holder on said piston.

14. A machine shop work support comprising a cylinder, a piston mounted for vertical and rotary movements therein, a clamping ring rotatively mounted on said cylinder, a work holder mounted to swing on said piston, means connecting said work holder to said clamping ring and operating during vertical movement of said piston for swinging said work holder on said piston, and means on said ring constructed to clamp said piston.

15. A machine shop work support comprising a cylinder, a piston mounted for vertical and rotary movements therein, a clamping ring rotatively mounted on said cylinder, a work holder mounted to swing on said piston, means connecting said work holder to said clamping ring and operating during vertical movement of said piston for swinging said work holder on said piston, and means on said ring constructed to clamp said cylinder.

16. A machine shop work support comprising a cylinder, a piston mounted for vertical and rotary movements therein, a clamping ring rotatively mounted on said cylinder, a work holder mounted to swing on said piston, means connecting said work holder to said clamping ring and operating during vertical movement of said piston for swinging said work holder on said piston, and means on said ring constructed to independently clamp said piston or said cylinder.

In testimony whereof I affix my signature in the presence of these two witnesses.

CHARLES A. OFFLITER.

Witnesses:
ARTHUR B. CREMER,
FRANKLIN MILLER.